(12) United States Patent
Huang et al.

(10) Patent No.: US 9,348,183 B2
(45) Date of Patent: May 24, 2016

(54) THIN FILM TRANSISTOR LIQUID CRYSTAL DISPLAY PANEL AND COLOR FILTER SUBSTRATE

(75) Inventors: Weiyun Huang, Beijing (CN); Minghua Xuan, Beijing (CN); Youngyik Ko, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 99 days.

(21) Appl. No.: 13/433,459

(22) Filed: Mar. 29, 2012

(65) Prior Publication Data

US 2012/0249912 A1  Oct. 4, 2012

(30) Foreign Application Priority Data

Mar. 30, 2011 (CN) .......................... 2011 1 0078916

(51) Int. Cl.
  *G02F 1/01* (2006.01)
  *G02F 1/1362* (2006.01)
(52) U.S. Cl.
  CPC ..................................... *G02F 1/1362* (2013.01)
(58) Field of Classification Search
  CPC .......................... G02F 2202/22; G02F 1/1362
  USPC ......................................................... 349/40
  See application file for complete search history.

(56) References Cited

U.S. PATENT DOCUMENTS

| | | | |
|---|---|---|---|
| 6,104,449 A | 8/2000 | Takahashi et al. | |
| 2002/0089793 A1* | 7/2002 | Nakagawa et al. | 360/294.4 |
| 2005/0151892 A1* | 7/2005 | Sakurai et al. | 349/40 |
| 2005/0253976 A1* | 11/2005 | Sekiguchi et al. | 349/40 |
| 2007/0030408 A1* | 2/2007 | Lin et al. | 349/40 |
| 2008/0079859 A1* | 4/2008 | Ota | 349/40 |
| 2008/0259009 A1* | 10/2008 | Gao | 345/87 |
| 2009/0046232 A1* | 2/2009 | Matsuyama et al. | 349/139 |
| 2010/0079694 A1 | 4/2010 | Yoshida et al. | |
| 2010/0165268 A1* | 7/2010 | Hsu et al. | 349/106 |
| 2010/0194723 A1* | 8/2010 | Moriwaki | 345/206 |
| 2010/0238095 A1* | 9/2010 | Zhang | 345/82 |

FOREIGN PATENT DOCUMENTS

| | | |
|---|---|---|
| CN | 1766722 A | 5/2006 |
| CN | 101713883 A | 5/2010 |

OTHER PUBLICATIONS

First Chinese Office Action dated Feb. 28, 2014; Appln. No. 201110078916.5.

\* cited by examiner

*Primary Examiner* — Michael Caley
*Assistant Examiner* — Edmond Lau
(74) *Attorney, Agent, or Firm* — Ladas & Parry LLP

(57) ABSTRACT

Embodiments of the disclosed technology relate to a thin film transistor liquid crystal display (TFT-LCD) panel comprising: a color filter substrate and a thin film transistor array substrate facing each other, and a liquid crystal layer interposed therebetween; and an electrostatic discharge circuit, wherein the color filter substrate comprises: a base substrate and a color filter film which has a first surface attached to the base substrate; a conductive layer attached to a second surface of the color filter film and electrically connected to the electrostatic discharge circuit to release charges on the conductive layer. The embodiments of the disclosed technology also provide a color filter substrate.

9 Claims, 3 Drawing Sheets

THIN FILM TRANSISTOR LIQUID CRYSTAL DISPLAY PANEL AND COLOR FILTER SUBSTRATE

BACKGROUND

Embodiments of the disclosed technology relates to a thin film transistor liquid crystal display panel and a color filter substrate.

Thin Film Transistor Liquid Crystal Display (TFT-LCD) panels are generally used for manufacturing small-sized or medium-sized liquid crystal displays due to their excellent color property, small thickness and light weight.

In order to improve image quality of the TFT-LCDs, Advanced-Super Dimensional Switching (AD-SDS) technology and In-Plane Switching (IPS) technology are proposed. As for the AD-SDS technology, a multiple dimensional electric field is formed by a horizontal electric field generated between edges of pixel electrodes in the same plane and a vertical electric field generated between the pixel electrodes and counter electrodes. With such a multiple dimensional electric filed, liquid crystal molecules with various orientations, which are located between the pixel electrodes within a liquid crystal cell, just above the electrodes and above the liquid crystal cell, can be rotated. Therefore, operating efficiency of in-plane orientation liquid crystal is enhanced and the light transmittance is increased. The TFT-LCDs manufactured by AD-SDS and IPS technologies have advantages such as wide viewing angle, high aperture ratio, short response time, absence of push mura, and etc.

However, due to the manufacturing processes, formation of electric field and deflection mode of the liquid crystal, the AD-SDS mode TFT-LCDs and IPS mode TFT-LCDs are not formed with a conductive layer on a front surface of a color filter substrate (the surface facing the liquid crystal layer). In this case, electric charges are easily accumulated on the color filter, and thus protection capability of the AD-SDS mode TFT-LCDs and the IPS mode TFT-LCDs is weaken. The color filter substrate comprises a base substrate and a color filter film attached on a front surface of the base substrate, and the color filter film comprises a black matrix and a trichromatic color layer (may further comprises a protection layer).

In order to protect the AD-SDS mode TFT-LCDs and the IPS mode TFT-LCDs from electrostatic damage, the following methods are usually used for performing Electro-Static discharge (ESD) protection in the prior art.

First Method

An Indium Tin Oxides (ITO) layer is deposited on a back surface (opposite to the surface facing to the liquid crystal layer) of the base substrate as a conductive layer and is grounded, so that the charges (from outside or generated by friction) on the color filter are discharged.

However, with this method, new device is needed for the ITO deposition which can not be performed by the existing devices, which leads to a higher cost; the liquid crystal cell is subject to being split during the deposition process, which decreases the production yield; and an additional bonding process with a conductive tape is needed for grounding the ITO layer, which makes the manufacturing process much complex.

Second Method

The black matrix is formed of a metal of Chromium (Cr) on the color filter and is grounded, so that the electric charges (from outside or generated by friction) on the color filter are discharged.

However, a complex process comprising coating film, exposing and developing, etching, lifting-off steps, etc. is needed for forming the black matrix, which leads to higher material and process costs.

Therefore, in terms of the ESD protection for TFT-LCD, the existing AD-SDS and IPS technology have disadvantages such as complicated processes and high cost.

SUMMARY OF THE INVENTION

An embodiment of the disclosed technology provides a thin film transistor liquid crystal display (TFT-LCD) panel comprising: a color filter substrate and a thin film transistor array substrate facing each other, and a liquid crystal layer interposed therebetween; and an electrostatic discharge circuit, wherein the color filter substrate comprises: a base substrate and a color filter film which has a first surface attached to the base substrate; a conductive layer attached to a second surface of the color filter film and electrically connected to the electrostatic discharge circuit to release charges on the conductive layer.

Another embodiment of the disclosed technology provides a color filter substrate comprising: a base substrate and a color filter film which has a first surface attached to the base substrate; a transparent conductive layer attached to a second surface of the color filter substrate; an electrostatic discharge circuit connected to the conductive layer to release charges on the conductive layer.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DESCRIPTION OF THE EMBODIMENTS

Embodiments of the disclosed technology now will be described more clearly and fully hereinafter with reference to the accompanying drawings, in which the embodiments of the disclosed technology are shown. Apparently, only some embodiments of the disclosed technology, but not all of embodiments, are set forth here, and the disclosed technology may be embodied in other forms. All of other embodiments made by those skilled in the art based on embodiments disclosed herein without mental work fall within the scope of the disclosed technology.

Figure 1:
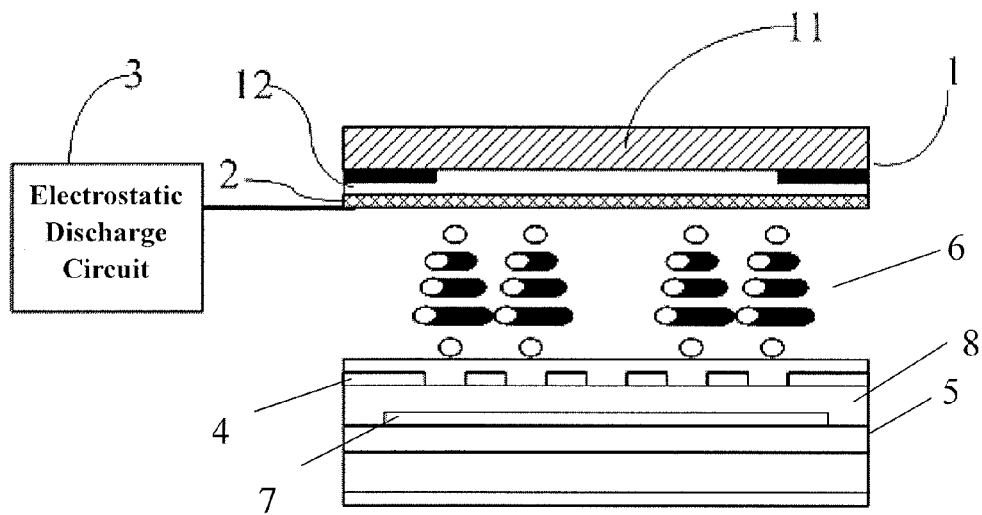
FIG. 1 is a schematic structural view of a TFT-LCD panel according to an embodiment of the disclosed technology.

As shown in FIG. 1, an embodiment of the disclosed technology provides a thin film transistor liquid crystal display (TFT-LCD) panel comprising a color filter substrate 1 and an array substrate 5 disposed opposite to each other and a liquid crystal layer 6 interposed therebetween.

The color filter substrate 1 comprises a base substrate 11 and a color filter film 12 comprising a black matrix 121 and a trichromatic color layer 122 (may further comprises a protection layer). A first surface of the color filter film 12 is attached to a surface of the base substrate which faces the liquid crystal layer.

In addition, the color filter substrate 1 further comprises a conductive layer 2 attached to a second surface of the color filter film 12.

The array substrate 5 comprises a common electrode 4 and a pixel electrode 7 with an insulating layer 8 therebetween. The common electrode and the pixel electrode of the liquid crystal display are only formed on the array substrate.

The liquid crystal display panel may further comprises a electrostatic discharge circuit 3 which is electrically connected with the conductive layer 2 and used for discharging charges on the conductive layer 2.

A method for manufacturing the above described color filter substrate 1 comprises at least the following steps in addition to other necessary steps.

Step 1, preparing a base substrate;

Step 2, forming a color filter film on the base substrate;

Wherein, step 2 comprises forming a black matrix and a trichromatic color layer on the base substrate, and may further comprise forming a protection layer on the trichromatic color layer;

Step 3, forming a conductive layer on the color filter film; and

Step 4, electrically connecting the conductive layer to the electrostatic discharge circuit.

Specifically, the above manufacturing method may use mask processes (comprising depositing, masking, exposing, developing, etching, lifting off processes, etc.) or printing process. Alternatively, desired pattern may be formed by depositing a particular material and then patterning the material by masking, exposing, developing processes, etc.

In addition, the electrostatic discharge circuit may be integrated in the array substrate 5, an integrate circuit, a flexible wiring plate, or other appropriate elements. The electrostatic discharge circuit may be connected to the conductive layer by conductive Au balls or conductive spacers. The conductive layer 2 may be an ITO layer or a transparent conductive layer made of other transparent conductive materials.

In the TFT-LCD panel provided in the embodiment of the disclosed technology, charges on the color filter can be accumulated on the conductive layer, and then discharged by the electrostatic discharge circuit, so as to realize the purpose of ESD protection. Also, the deposition sequence for forming the color filter substrate of the above TFT-LCD panel is the same as that for TN (Twisted Nematic) LCD, so that the deposition of respective layers in the color filter substrate of the above TFT-LCD panel may be performed by using the devices for forming the existing TN LCD without buying new devices. Therefore, the TFT-LCD panel according to the embodiment has excellent device compatibility and process compatibility. Compared with the ESD protection in the existing AD-SDS and IPS technology, the ESD protection according to the present embodiment has advantages such as simple processes and low cost.

Figure 2:
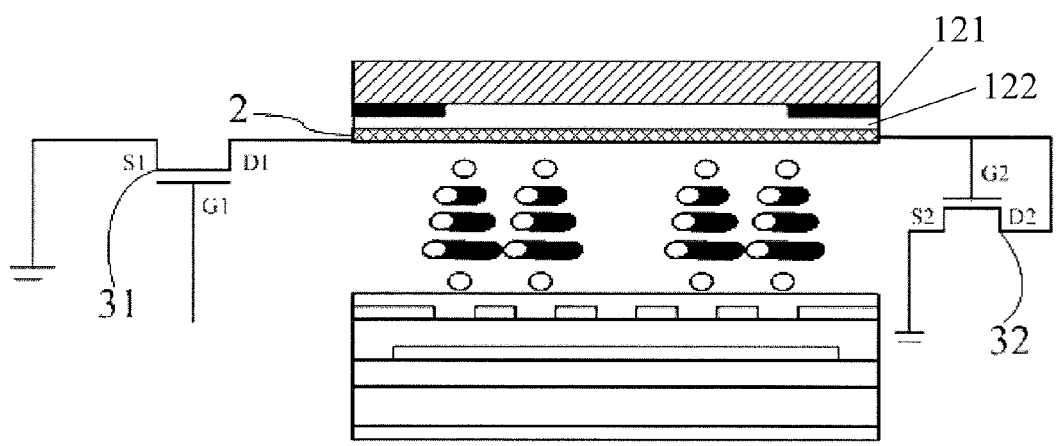
FIG. 2 is a schematic structural view of a TFT-LCD panel according to another embodiment of the disclosed technology.

In order to release the charges (from outside or generated by friction) on the conductive layer, as shown in FIG. 2, the electrostatic discharge circuit comprises a first transistor 31 having a first gate G1, a first drain D1, and a first source S1, wherein the first gate G1 is used to receive a switching signal which controls the switching of the first transistor 31; the first drain D1 is connected to the conductive layer 2, and the first source S1 is grounded (as shown in FIG. 2); alternatively, the first drain D1 is grounded, and the first source S1 is connected to the conductive layer 2 (not shown).

Figure 3:
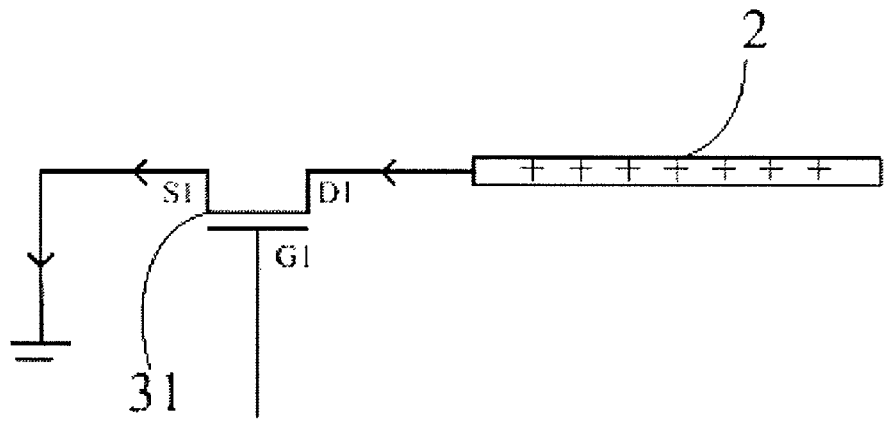
FIG. 3 is a diagram showing a discharge structure in the TFT-LCD panel as shown in FIG. 2.

FIG. 3 shows an example in which the first drain D1 is connected to the conductive layer 2 and the first source S1 is grounded. As shown in FIG. 3, when the first gate G1 receives a signal for turning on the first transistor 31, the first drain D1 and the first source S1 are in a state being electrically communicated, so that the charges on the conductive layer 2 can be released to the ground. When the first gate G1 receives a signal for turning off the first transistor 31, the first drain D1 and the first source S1 are in a state of being electrically separated, so that the release of charges is stopped.

The switching signal may be a periodic pulse signal (the frequency of the pulse may be designed as required). The charges on the conductive layer can be discharged periodically with the periodic pulse signal as the switching signal, which improves the ESD protection effect. Alternatively, the switching signal may be a gate signal for the above TFT-LCD panel, and in this case, the first gate G1 may be connected to one gate signal line of the TFT-LCD panel, so that the existing signal is used as the switching signal and the wiring area for the TFT-LCD panel is saved. Alternatively, the switching signal may be a master switching signal which is used for controlling the TFT-LCD panel to be turned on and off. In this case, the first transistor releases the charges on the conductive layer only when the TFT-LCD panel is turned on or turned off.

The first transistor may be replaced by other discharge devices or discharge circuits, as long as the charges on the conductive layer can be discharged.

In addition, the TFT-LCD panel may have instantaneous strong current or perform an ESD test in some times. In order to avoid the damage to the TFT-LCD panel by the instantaneous strong current, the electrostatic discharge circuit 3 may have the following arrangements.

First Arrangement

As shown in FIG. 2, the electrostatic discharge circuit may further comprise a second transistor 32 having a second gate G2, a second drain D2 and a second source S2, wherein the second gate G2 is connected to the conductive layer 2; the second drain D2 is connected to the conductive layer 2, and the second source S2 is grounded (as shown in FIG. 2); alternatively, the second drain D2 is grounded, and the second source S2 is connected to the conductive layer 2 (not shown). In addition, according to the embodiment of the disclosed technology, the electrostatic discharge circuit is not limited to the arrangement shown in FIG. 2, but may comprise the second transistor 32 without the above first transistor 31.

Figure 4:
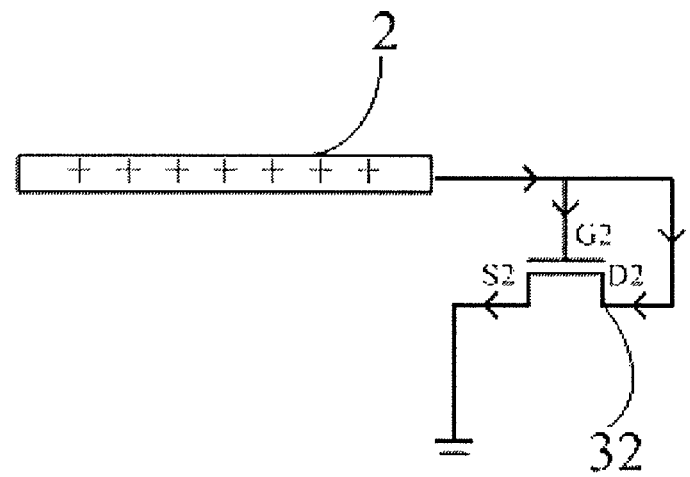
FIG. 4 is another diagram showing a discharge structure in the TFT-LCD panel as shown in FIG. 2.

FIG. 4 shows an example in which the second drain D2 is connected to the conductive layer 2 and the second source S2 is grounded. As shown in FIG. 4, when a large amount of charges are accumulated on the conductive layer 2, the conductive layer 2 has a voltage with respect to the ground. When the voltage is large enough to turn on the second transistor 32, the second drain D2 and the second source S2 are in a state of being electrically communicated, so that the charges on the conductive layer 2 can be released. Thus, the ESD protection is realized and the damage to the TFT-LCD panel by the instantaneous strong current is avoided.

Second Arrangement

Figure 5:
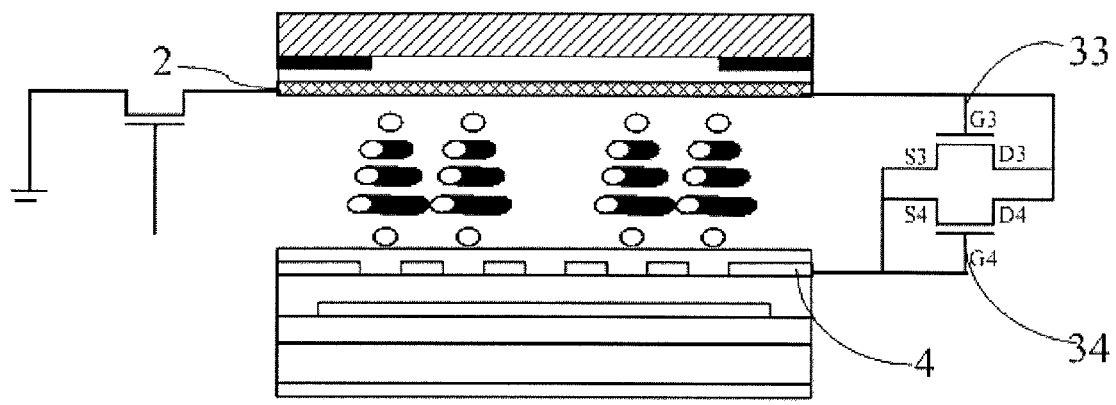
FIG. 5 is a schematic structural view of a TFT-LCD panel according to still another embodiment of the disclosed technology.

As shown in FIG. 5, the electrostatic circuit may further comprise a third transistor 33 having a third gate G3, a third drain D3, and a third source S3, wherein the third gate G3 is connected to the conductive layer 2; the third drain D3 is connected to the conductive layer 2, and the third source S3 is connected to a common electrode 4 (as shown in FIG. 5); alternatively, the third drain D3 is connected to the common electrode 4, and the third source S3 is connected to the conductive layer 2 (not shown).

Figure 6:
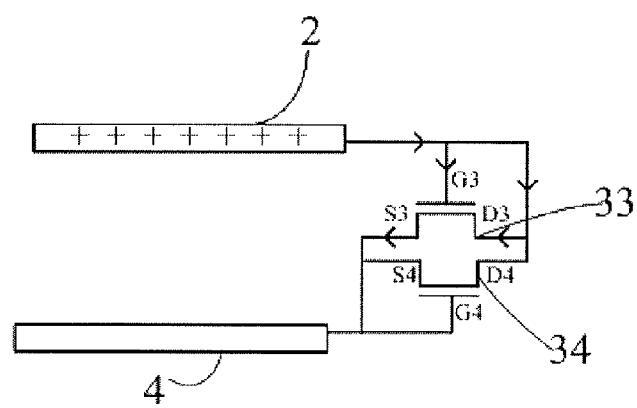
FIG. 6 is a diagram showing a discharge structure in the TFT-LCD panel as shown in FIG. 5.

FIG. 6 shows an example in which the third drain D3 is connected to the conductive layer 2 and the third source S3 is connected to the common electrode 4. As shown in FIG. 6, when a large amount of charges are accumulated on the conductive layer 2, the conductive layer 2 has a higher voltage with respect to the common electrode 4. When the voltage of the conductive layer 2 is large enough to turn on the third transistor 33, the third drain D3 and the third source S3 are in a state being electrically communicated, so that the large amount of charges on the conductive layer 2 are transferred to the common electrode 4. Thus, the large amount of charges on the conductive layer 2 are released or reduced, the ESD protection is realized, and the damage to the TFT-LCD panel by the instantaneous strong current is avoided.

As shown in FIG. 5, the electrostatic circuit may further comprise a fourth transistor 34 having a fourth gate G4, a fourth drain D4, and a fourth source S4, wherein the fourth gate G4 is connected to the common electrode 4; the fourth drain D4 is connected to the conductive layer 2, and the fourth source S4 is connected to the common electrode 4 (as shown in FIG. 5); alternatively, the fourth drain D4 is connected to the common electrode 4, and the fourth source S4 is connected to the conductive layer 2 (not shown).

In addition, according to the embodiment of the disclosed technology, the electrostatic circuit is not limited to the structure shown in FIG. 5, but may also comprise the first transistor 31 and the fourth transistor 34 without the third transistor 33.

When a large amount of negative charges are accumulated on the conductive layer 2, the common electrode has a higher voltage with respect to the conductive layer. When the voltage of the common electrode is large enough to turn on the fourth transistor, the fourth drain D4 and the fourth source S4 are in a state being electrically communicated, so that the charges on the conductive layer are transferred to the common electrode. Thus, the charges on the conductive layer are released or reduced, the ESD protection is realized, and the damage to the TFT-LCD panel by the instant strong current is avoided.

The above electrostatic discharge circuit may also be composed of other discharge device, as long as the damage to the TFT-LCD panel by the instantaneous strong current is avoided.

In addition, when the disclosed technology is implemented, a plurality of transistors which are selected from the above four transistors as needed are disposed on the TFT-LCD panel. For example, both of the first transistor and the fourth transistor may be disposed on the TFT-LCD panel, or all of the first, second, and third transistors may be disposed on the TFT-LCD panel.

In addition, the disclosed embodiments further provide a color filter substrate having the same structure as the color filter substrate in the above liquid crystal display panel. Thus, the overlapping description is not repeated here.

The embodiments of the disclosed technology are described by referring to the structure of AD-SDS mode TFT-LCD panel in detail, however, the disclosed technology is not limited thereto. For example, the panel according to the disclosed technology can be an in-plane switching (IPS) or a fringe field switching (FFS) mode liquid crystal display panel. In the panels of the above modes, both the pixel electrode and the common electrode are provided on the array substrate. According to the embodiments of the disclosed technology, the conductive layer is provided on the color filter film and the accumulated charges are released through the electrostatic discharge circuit so that the electrostatic protection capability of the color filter substrate in these modes of liquid crystal display panels is enhanced. In addition, as for the electrostatic discharge circuits according to the embodiments of the disclosed technology, it can also be applied in a TN mode TFT-LCD panel.

It should be noted that the above embodiments only have the purpose of illustrating the disclosed technology, but not limiting it. Although the disclosed technology has been described with reference to the above embodiment, those skilled in the art should understand that modifications or alternations can be made to the solution or the technical feature in the described embodiments without departing from the spirit and scope of the disclosed technology.

What is claimed is:

1. A thin film transistor liquid crystal display (TFT-LCD) panel, comprising:
   a color filter substrate and a thin film transistor array substrate facing each other, and a liquid crystal layer interposed therebetween;
   an electrostatic discharge circuit; and
   a common electrode and a pixel electrode with an insulating layer therebetween,
   wherein the color filter substrate comprises:
      a base substrate and a color filter film which has a first surface attached to the base substrate;
      a conductive layer attached to a second surface of the color filter film and electrically connected to the electrostatic discharge circuit to directly release charges on the conductive layer,
   wherein the common electrode and the pixel electrode of the panel are only provided on the array substrate,
   wherein the electrostatic discharge circuit comprises: a first transistor having a first gate, a first drain, and a first source; the first gate being configured to receive a switching signal which controls the switching of the first transistor; one of the first drain and the first source being electrically connected to the conductive layer, and the other one being grounded,
   wherein the switching signal is a periodic pulse signal, a gate signal for the TFT-LCD panel, or a master switching signal for controlling the TFT-LCD panel,
   wherein the conductive layer is only electrically connected to the electrostatic discharge circuit.

2. The TFT-LCD panel of claim 1, wherein the electrostatic discharge circuit further comprises:
   a second transistor having a second gate, a second drain, and a second source;
   the second gate being electrically connected to the conductive layer;
   one of the second drain and the second source being electrically connected to the conductive layer, and the other one being grounded.

3. The TFT-LCD panel of claim 1, wherein the array substrate comprises a common electrode, and the electrostatic discharge circuit comprises:
   a third transistor having a third gate, a third drain, and a third source;
   the third gate being connected to the conductive layer;

one of the third drain and the third source being electrically connected to the conductive layer, and the other one is connected to the common electrode on the array substrate.

4. The TFT-LCD panel of claim 1, wherein, the array substrate comprises a common electrode, and the electrostatic discharge circuit further comprises:
  a fourth transistor having a fourth gate, a fourth drain, and a fourth source;
  the fourth gate is connected to the common electrode;
  one of the fourth drain and the fourth source is electrically connected to the conductive layer, and the other one is electrically connected to the common electrode.

5. The TFT-LCD panel of claim 1, wherein the electrostatic discharge circuit is integrated in the array substrate, an integrated circuit, or a flexible wiring plate.

6. The TFT-LCD panel of claim 1, wherein the electrostatic discharge circuit is electrically connected to the conductive layer via conductive Au balls or conductive pads.

7. The TFT-LCD panel of claim 1, wherein the conductive layer is a nano indium tin oxide or indium zinc oxide.

8. The TFT-LCD panel of claim 1, wherein the panel is an in-plane switching (IPS), a fringe field switching (FFS) or an advanced-super dimensional switching (AD-SDS) mode liquid crystal display panel.

9. A color filter substrate, comprising:
  a base substrate and a color filter film which has a first surface attached to the base substrate;
  a transparent conductive layer attached to a second surface of the color filter film;
  an electrostatic discharge circuit electrically connected to the conductive layer directly to release charges on the conductive layer,
  wherein the electrostatic discharge circuit comprises: a first transistor having a first gate, a first drain, and a first source; the first gate being configured to receive a switching signal which controls the switching of the first transistor; one of the first drain and the first source being electrically connected to the conductive layer, and the other one being grounded,
  wherein the switching signal is a periodic pulse signal, a gate signal for a TFT-LCD panel, or a master switching signal for controlling a TFT-LCD panel.

* * * * *